(12) United States Patent
Tanaka et al.

(10) Patent No.: US 7,368,088 B2
(45) Date of Patent: May 6, 2008

(54) APPARATUS FOR PRODUCING PURIFIED AQUEOUS HYDROGEN PEROXIDE SOLUTION

(75) Inventors: Fujio Tanaka, Sendai (JP); Takashi Adachi, Sendai (JP); Toshimi Suzuki, Sendai (JP); Mutsuro Noguchi, Sendai (JP); Tomoaki Kobayashi, Sendai (JP)

(73) Assignee: Santoku Chemical Industries Co., Ltd., Tokyo (JP)

( * ) Notice: Subject to any disclaimer, the term of this patent is extended or adjusted under 35 U.S.C. 154(b) by 482 days.

(21) Appl. No.: 10/834,794

(22) Filed: Apr. 29, 2004

(65) Prior Publication Data

US 2004/0202588 A1    Oct. 14, 2004

Related U.S. Application Data

(62) Division of application No. 09/855,152, filed on May 14, 2001, now Pat. No. 6,783,748.

(30) Foreign Application Priority Data

Jun. 21, 2000   (JP)   ............... 2000-186901
Dec.  6, 2000   (JP)   ............... 2000-371997

(51) Int. Cl.
   *B32B 5/02*   (2006.01)
(52) U.S. Cl. ............. 422/106; 422/109; 422/110; 422/112
(58) Field of Classification Search ............... 210/143, 210/149, 739, 740, 742, 744; 422/106, 109, 422/112, 110; 700/266
See application file for complete search history.

(56) References Cited

U.S. PATENT DOCUMENTS 3,595,385 A  *  7/1971  Duff .................. 209/1

(Continued)

FOREIGN PATENT DOCUMENTS

DE    1 024 925 A1    2/1958

(Continued)

OTHER PUBLICATIONS

XP002256083, Ullmann's encyclopedia of industrial chemistry, 5th Ed., vol. A14, Ion Exchangers, pp. 436-439, VCH, Germany (1990).

*Primary Examiner*—N. Bhat
(74) *Attorney, Agent, or Firm*—The Webb Law Firm, P.C.

(57) ABSTRACT

An apparatus for producing a purified aqueous hydrogen peroxide solution. The apparatus includes at least one purifier tower packed with an ion exchange resin, a chelate resin or an adsorption resin for receiving a charged aqueous hydrogen peroxide solution containing impurities so as to effect contact thereof with the ion exchange resin, chelate resin or adsorption resin, thereby purifying the charged aqueous hydrogen peroxide solution, which apparatus further comprises a feed pump of given output capable of causing the charged aqueous hydrogen peroxide solution to flow to the purifier tower, a flow sensor capable of sensing a flow rate of charged aqueous hydrogen peroxide solution being fed to the purifier tower by means of the feed pump, and a flow control unit capable of controlling the output of the feed pump on the basis of a detection result of the flow sensor so as to maintain the flow of charged aqueous hydrogen peroxide solution being fed to the purifier tower at a constant rate.

25 Claims, 3 Drawing Sheets

U.S. PATENT DOCUMENTS

| | | |
|---|---|---|
| 4,999,179 A | 3/1991 | Sugihara et al. |
| 5,397,475 A | 3/1995 | Millar et al. |
| 5,614,165 A | 3/1997 | Sugihara et al. |
| 5,733,521 A | 3/1998 | Minamikawa et al. |
| 5,906,738 A | 5/1999 | Morisaki et al. |
| 5,928,621 A | 7/1999 | Ledon et al. |
| 5,932,187 A | 8/1999 | Ledon et al. |
| 5,961,947 A | 10/1999 | Ledon et al. |
| 6,001,324 A | 12/1999 | Ledon et al. |
| 6,013,237 A | 1/2000 | Kajiwara et al. |
| 6,054,109 A | 4/2000 | Saito et al. |
| 6,296,829 B1 | 10/2001 | Devos et al. |
| 6,540,921 B1 | 4/2003 | Devos et al. |

FOREIGN PATENT DOCUMENTS

| | | |
|---|---|---|
| EP | 0 245 940 A1 | 11/1987 |
| EP | 0 846 654 A1 | 6/1998 |
| EP | 1 095 905 A1 | 5/2001 |
| JP | 03-107477 A | 5/1991 |
| JP | 09-077504 A | 3/1997 |
| JP | 09-276811 A | 10/1997 |
| JP | 10-259009 A | 9/1998 |
| JP | 9-278418 A | 4/2000 |

* cited by examiner

32 Liquid Drawoff Port

APPARATUS FOR PRODUCING PURIFIED AQUEOUS HYDROGEN PEROXIDE SOLUTION

CROSS-REFERENCE TO RELATED APPLICATION

This application is a divisional of U.S. patent application Ser. No. 09/855,152, filed May 14, 2001, entitled "Process for Producing Purified Aqueous Hydrogen Peroxide Solution", now U.S. Pat. No. 6,783,748.

FIELD OF THE INVENTION

The present invention relates to an apparatus for producing a purified aqueous hydrogen peroxide solution. More particularly, the present invention is concerned with an apparatus for producing a high-purity aqueous hydrogen peroxide solution, whereby impurities can be removed from a charged (crude) aqueous hydrogen peroxide solution with high reproducibility.

BACKGROUND OF THE INVENTION

An aqueous hydrogen peroxide solution is widely used in many fields, for example, for bleaching paper and pulp and as a component in chemical polishing fluids. In recent years, the aqueous hydrogen peroxide solution has increasingly been used in the electronic industry, for example, as a cleaning agent for silicon wafers and as a cleaning agent in production processes of semiconductors. Accordingly, there is a demand for an aqueous hydrogen peroxide solution of enhanced quality in purity as obtained by minimizing the content of various impurities in the aqueous hydrogen peroxide solution.

Generally, hydrogen peroxide is now produced exclusively by the anthraquinone process. In the anthraquinone process, first, a derivative of anthraquinone, such as a 2-alkylanthraquinone, is hydrogenated into anthrahydroquinone in the presence of a hydrogenation catalyst in a water-insoluble solvent. Subsequently, the catalyst is removed, and the reaction product is oxidized with air. Thus, not only is the original 2-alkylanthraquinone regenerated but also hydrogen peroxide is produced at the same time. The produced hydrogen peroxide is extracted from the oxidation product with water to thereby obtain an aqueous solution containing hydrogen peroxide. This process is generally known as the anthraquinone autoxidation process. The aqueous hydrogen peroxide solution produced by the anthraquinone autoxidation process contains inorganic ion/compound impurities, such as Al, Fe, Cr, Na and Si, attributed to, for example, the materials constituting the apparatus. Therefore, the aqueous hydrogen peroxide solution is subjected to purification operation for removing such impurities to thereby attain a high purity in accordance with the required quality in particular use.

Especially in the electronic industry, an extremely high purity is required for the aqueous hydrogen peroxide solution. It is required that, in the aqueous hydrogen peroxide solution, the content of organic impurities be not greater than 10 ppm and the content of metal ion impurities be not greater than 1 ppb. For the removal of impurities from the aqueous hydrogen peroxide solution, it is generally known to employ an ion exchange resin, a chelate resin, an adsorption resin or the like. When the removal of impurities is carried out on an industrial scale with the use of such a resin, there is commonly employed the continuous liquid pass method (tower process) which ensures high operation efficiency and high removing efficiency.

The purification of aqueous hydrogen peroxide solution by the tower process involves such a problem that bubbles are formed by autolysis of hydrogen peroxide, which is a property peculiar to hydrogen peroxide, and the bubbles stick to resin circumstances to thereby lower purification efficiency, i.e., impurity removing efficiency.

As a means for solving this problem, for example, Japanese Patent Laid-open Publication No. 9(1997)-77504 discloses a process in-which an upper part of an ion exchange resin tower is pressurized so as to increase the solubility of bubbles formed by autolysis of hydrogen peroxide, thereby eliminating bubbles from the purifier tower.

However, the process disclosed in Japanese Patent Laid-open Publication No. 9(1997)-77504 has a drawback in that the content of metal ion impurities in purified aqueous hydrogen peroxide solution is 1 ppb, which is not necessarily satisfactory level, and that quality reproducibility is poor. Moreover, when the operation time is prolonged, it may occur that bubbles are accumulated in the ion exchange resin tower with the result that the area of contact between ion exchange resin and aqueous hydrogen peroxide solution is decreased, or the complete adsorption band (part where the adsorption of impurity ions has been completed) or exchange band (part where ion exchange is being performed) of ion exchange resin is disordered. Consequently, satisfactory removal of impurities may be inhibited, and further the passing of aqueous hydrogen peroxide solution may be hindered to thereby bring about problems such as pressurization and temperature rise within the ion exchange resin tower.

In these circumstances, the inventors have made extensive and intensive studies with a view toward solving the above problems. As a result, it has been found that, when the aqueous hydrogen peroxide solution is purified by controlling the output of a feed pump for charged aqueous hydrogen peroxide solution in cooperation with a flow sensor capable of sensing a flow rate of charged aqueous hydrogen peroxide solution being fed to a purifier tower so as to bring the charged aqueous hydrogen peroxide solution into contact with an ion exchange resin while maintaining the flow of charged aqueous hydrogen peroxide solution at a constant rate, the impurities of aqueous hydrogen peroxide solution can be removed to the order of ppt (parts per $10^{12}$). It has also been found that, in this purification process, not only is the reproducibility of impurity removing level very high but also the pressurization and temperature rise during purification can be avoided to thereby realize a safe purification of aqueous hydrogen peroxide solution. The present invention has been completed on the basis of these findings.

When the aqueous hydrogen peroxide solution is purified by bringing the aqueous hydrogen peroxide solution into contact with an ion exchange resin, a chelate resin or an adsorption resin while maintaining the flow of aqueous hydrogen peroxide solution being fed to the purifier tower at a constant rate according to the present invention, sticking of bubbles to the ion exchange resin, etc. within the purifier tower can be suppressed. Further, in this purification process, not only can the leaving of bubbles in the purifier tower be avoided but also disordering of the complete adsorption band or ion exchange band can be suppressed. Still further, in this purification process, the aqueous hydrogen peroxide solution can be easily passed through the purifier tower. Thus, a purification efficiency of aqueous hydrogen peroxide solution is high.

It is an object of the present invention to provide an apparatus for producing a purified aqueous hydrogen peroxide solution, which process is free from any disordering of ion exchange band during purification, free from bubbles remaining in a purifier tower and free from any pressurization or temperature rise within the purifier tower to thereby enable effecting a safe and efficient contract of aqueous hydrogen peroxide solution with an ion exchange resin or the like.

SUMMARY OF THE INVENTION

The process for producing a purified aqueous hydrogen peroxide solution according to one aspect of the present invention comprises passing a charged aqueous hydrogen peroxide solution containing impurities through a purifier tower packed with an ion exchange resin, a chelate resin or an adsorption resin to thereby purify the charged aqueous hydrogen peroxide solution, wherein there are provided a feed pump of given output capable of causing the charged aqueous hydrogen peroxide solution to flow to the purifier tower and, further, a flow sensor capable of sensing a flow rate of charged aqueous hydrogen peroxide solution being fed to the purifier tower and wherein the output of the feed pump is controlled in cooperation with the flow sensor so as to bring the charged aqueous hydrogen peroxide solution into contact with the ion exchange resin, chelate resin or adsorption resin while maintaining the flow of charged aqueous hydrogen peroxide solution at a constant rate. In this process, it is preferred that the output of the feed pump for the charged aqueous hydrogen peroxide solution be controlled by means of an inverter.

The apparatus for producing a purified aqueous hydrogen peroxide solution according to another aspect of the present invention comprises at least one purifier tower packed with an ion exchange resin, a chelate resin or an adsorption resin, through which a charged aqueous hydrogen peroxide solution containing impurities is passed so as to effect contact thereof with the ion exchange resin, chelate resin or adsorption resin, thereby purifying the charged aqueous hydrogen peroxide solution, which apparatus further comprises:

a feed pump of given output capable of causing the charged aqueous hydrogen peroxide solution to flow to the purifier tower, a flow sensor capable of sensing a flow rate of charged aqueous hydrogen peroxide solution being fed to the purifier tower by means of the feed pump, and a flow control unit capable of controlling the output of the feed pump on the basis of a detection result of the flow sensor so as to maintain the flow of charged aqueous hydrogen peroxide solution being fed to the purifier tower at a constant rate.

When control is effected so as to maintain the flow of aqueous hydrogen peroxide solution at a constant rate as aforementioned, the leaving of gas in the purifier tower packed with an ion exchange resin can be avoided. Further, disordering of ion exchange band can be avoided, and an impurity ion adsorption layer (ion exchange band) can be formed perpendicularly to the flow rate and sharply. Thus, a lowering of purification efficiency can be avoided.

The flow rate of aqueous hydrogen peroxide solution being fed into the purifier tower is preferably 5 to 40 hr$^{-1}$ in terms of space velocity. The flow rate of aqueous hydrogen peroxide solution is preferably controlled so that its variation falls within the range of ±2.5%.

In the process for producing a purified aqueous hydrogen peroxide solution according to the present invention, it is preferred that any part brought into contact with the aqueous hydrogen peroxide solution be composed of a fluororesin.

DETAILED DESCRIPTION OF THE INVENTION

The process for producing a purified aqueous hydrogen peroxide solution according to the present invention will be described in detail below. Herein, %, ppm, ppb and ppt are all on the weight basis.

In the present invention, the process for producing a purified aqueous hydrogen peroxide solution according to one aspect of the present invention comprises passing a charged aqueous hydrogen peroxide solution containing impurities through a purifier tower packed with an ion exchange resin, a chelate resin or an adsorption resin to thereby purify the charged aqueous hydrogen peroxide solution, wherein there are provided a feed pump of given output capable of causing the charged aqueous hydrogen peroxide solution to flow to the purifier tower and further a flow sensor capable of sensing a flow rate of charged aqueous hydrogen peroxide solution being fed to the purifier tower and wherein the output of the feed pump is controlled in cooperation with the flow sensor so as to bring the charged aqueous hydrogen peroxide solution into contact with the ion exchange resin, chelate resin or adsorption resin while maintaining the flow of charged aqueous hydrogen peroxide solution at a constant rate.

Figure 1:
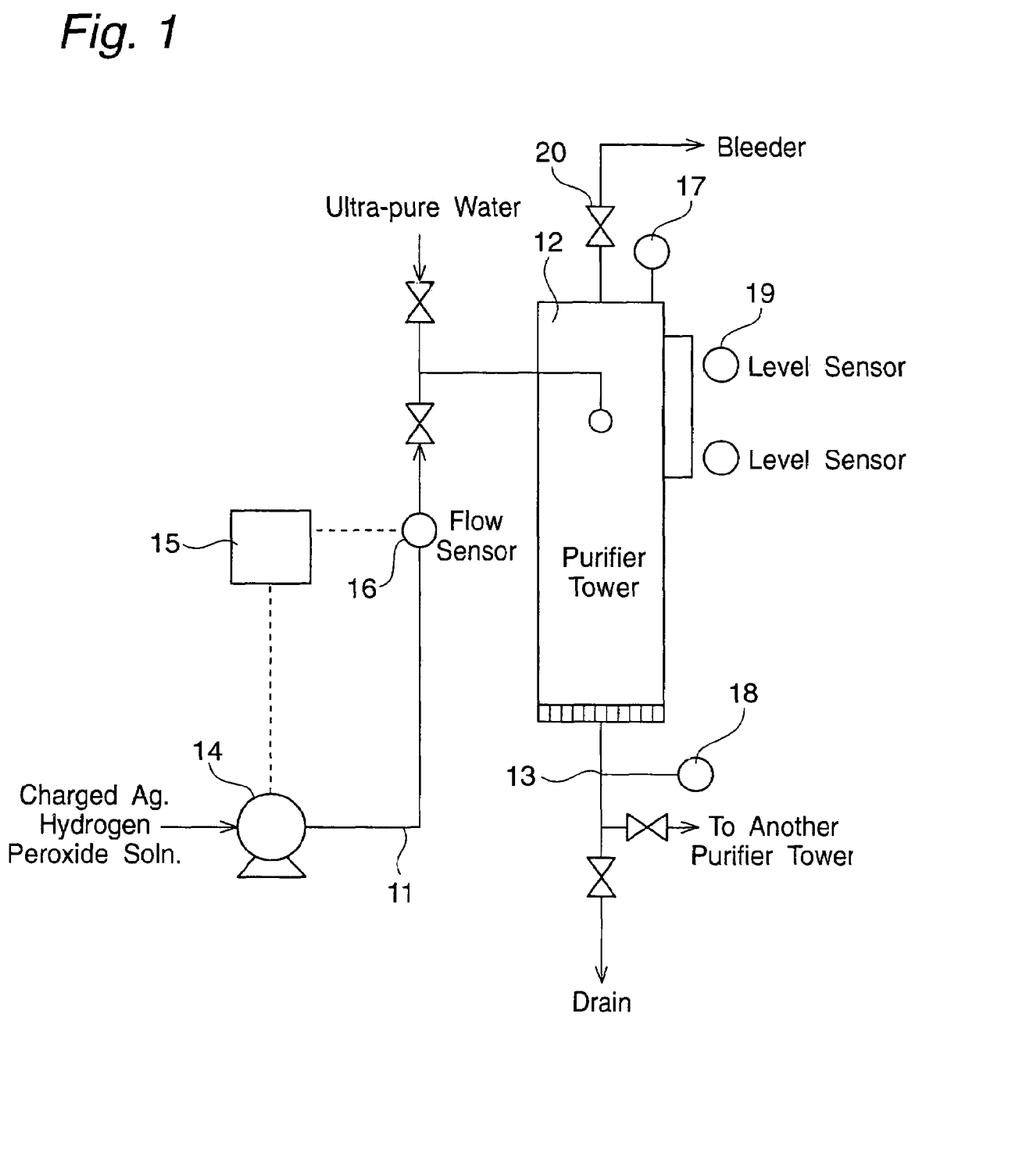
FIG. 1 is a schematic diagram showing the flow of operation of the process for producing a purified aqueous hydrogen peroxide solution according to the present invention.

This invention will be specified with reference to the flow diagram of FIG. 1. FIG. 1 is a flow diagram showing one mode of process for producing a purified aqueous hydrogen peroxide solution according to the present invention. In FIG. 1, numerals 11, 13 denote lines; numeral 12 a purifier tower; numeral 14 a liquid feed pump; numeral 15 an inverter; numeral 16 a flow sensor; numeral 17 a pressure sensor; numeral 18 a temperature sensor; and numeral 19 a level sensor.

A charged aqueous hydrogen peroxide solution is fed through line 11 into purifier tower 12 by means of liquid feed pump 14. The aqueous hydrogen peroxide solution is brought into contact with an ion exchange resin in the purifier tower 12, drawn from the purifier tower 12 and passed through line 13 into other purifier tower(s) for contact with an ion exchange resin. The thus purified aqueous hydrogen peroxide solution is collected in a tank, subjected to concentration adjustment and product inspection, stocked, packed and delivered.

As the charged aqueous hydrogen peroxide solution which can be employed in the present invention, there can be mentioned those produced by known processes, such as the anthraquinone autoxidation process and the direct synthesis process in which hydrogen is directly reacted with oxygen.

The charged aqueous hydrogen peroxide solution generally contains metal ion impurities on the order of parts per billion (ppb) to tens of parts per million (ppm). As impurities contained in the charged aqueous hydrogen peroxide solution, there can be mentioned metal ion impurities such as those of Ag, Al, As, Au, B, Ba, Be, Bi, Ca, Cd, Co, Cr, Fe, Ga, Ge, In, K, Li, Mg, Mo, Na, Nb, Ni, Pb, Pd, Pt, Sb, Sr, Ta, Ti, Tl, V, Zn and Zr, and further silicon oxide impurities and organic impurities. These impurities are attributed to, for example, residues of catalysts, etc. used in the production of aqueous hydrogen peroxide solution by the anthraquinone process, anthraquinone decomposition products, solvents used in the production of aqueous hydrogen peroxide solution, water used in production (e.g., extraction, distillation and dilution) of an aqueous hydrogen peroxide, floating dust in air and materials of production apparatus.

As aforementioned, in the present invention, the charged aqueous hydrogen peroxide solution is fed through the line 11 into the purifier tower 12 by means of the liquid feed pump 14. The line 11 is fitted with flow sensor 16. Signal from the flow sensor 16 is sensed by inverter 15. The inverter 15 controls the output of the liquid feed pump 14 so as to maintain the flow of aqueous hydrogen peroxide solution at a constant rate.

The flow sensor 16 is appropriately selected from among those of the vortex type, the paddle type, the electromagnetic type, the ultrasonic type and other types. All of these flow sensors measure the flow velocity and flow quantity and feeds signals back to the inverter for controlling of the output of the liquid feed pump. Among the flow sensors, those of the vortex type and the paddle type are preferred.

In the present invention, controlling is effected so that the flow of aqueous hydrogen peroxide solution being fed into the purifier tower is maintained at a constant rate. Thus, sticking of formed bubbles to, for example, the ion exchange resin and consequently remaining in the purifier tower can be avoided. As a result, a decrease of the area of contact of aqueous hydrogen peroxide solution with the ion exchange resin or the like and also disordering of the above complete adsorption band or exchange band can be avoided for a prolonged period of time. Therefore, the impurity removing efficiency can be held high for a prolonged period of time.

In the present invention, the space velocity (SV) at which the aqueous hydrogen peroxide solution is passed through the purifier tower 12 is preferably in the range of 5 to 40 $hr^{-1}$, still preferably 10 to 30 $hr^{-1}$. It is preferred that controlling be effected so that the variation of flow rate of aqueous hydrogen peroxide solution falls within the range of ±2.5%. This flow control enables highly efficiently expelling and removing of bubbles without remaining thereof in the purifier tower.

The aqueous hydrogen peroxide solution introduced in the purifier tower 12 is passed through a center nozzle (not shown) provided inside the purifier tower so that the aqueous hydrogen peroxide solution is caused to uniformly flow downward. The ion exchange resin, chelate resin or adsorption resin is preferably packed in the purifier tower so as to occupy 40 to 80%, still preferably 45 to 75%, of the internal volume of the purifier tower.

Referring to FIG. 1, the purifier tower 12 is generally fitted with level sensors 19 arranged with a given distance vertically so as to maintain the liquid level in order to prevent drying of the ion exchange resin or the like. As the level sensor, use can be made of those of the photovoltaic type and the electrostatic capacity type. Of these, the level sensor of the electrostatic capacity type is preferred. The level sensors 19 sense the presence of liquid as a signal. When the liquid level is below the lower limit of level sensor, that is, when the liquid surface is detected by the under level sensor 19, the internal pressure of the purifier tower 12 is increased to excess, so that a separate level control unit (not shown) is operated. Thus, bleeder valve 20 disposed at the top of the purifier tower is opened while a valve disposed at the bottom of the purifier tower is closed to thereby reduce the internal pressure of the purifier tower through the bleeder valve 20. As a result, the liquid surface is returned to normal.

On the other hand, when the liquid surface is sensed at the upper limit of level sensor, that is, when the liquid surface is detected by the upper level sensor 19, the internal pressure of the purifier tower 12 is decreased to excess, so that a separate level control unit (not shown) is operated. Thus, the bleeder valve 20 disposed at the top of the purifier tower is closed while the valve disposed at the bottom of the purifier tower is opened. As a result, the liquid surface is returned to normal.

In the present invention, it is preferred that the pipes for liquid feeding and the internal wall of the purifier tower be composed of a fluororesin. That is, it is preferred that the parts brought into contact with the aqueous hydrogen peroxide solution be composed of a fluororesin. When these liquid contact parts are composed of a fluororesin, mixing of impurities from constituent members can be inhibited. In the prior art, hard glass, quartz, vinyl chloride resin, acrylic resin, FRP and steel having linings made from urethane, etc. are commonly employed as materials of purification apparatus, and it has occurred that impurities are leached from such materials into an aqueous hydrogen peroxide solution.

The practical method of constituting the liquid contact parts by a fluororesin comprises, for example, preparing the member per se from a fluororesin, or lining or coating a stainless steel or the like with a fluororesin.

As the fluororesin, generally, polytetrafluoroethylene resin (PTFE) and tetrafluoroethylene/perfluoroalkyl vinyl ether copolymer resins (PFA) can appropriately be employed because these are free from metal leaching and because these are stable and are not deteriorated in hydrogen peroxide. In recent years, in accordance with the progress of processing technology, a stainless steel as a base material can be lined or coated with such fluororesins. Now, large-size lined (coated) vessels and large-size lined (coated) tower, equipment, piping, etc. are being fabricated, and these are utilized without any problem even under superatmospheric or reduced pressure conditions. As other available fluororesins, there can be mentioned, for example, tetrafluoroethylene/hexafluoropropylene copolymer resin (FEP), polytrifluorochloroethylene resin (PCTFE) and tetrafluoroethylene/ethylene copolymer (ETFE).

In particular, when the internal wall of the purifier tower 12 is composed of a fluororesin, the aqueous hydrogen peroxide solution located in the neighborhood of the internal wall surface is forced toward the center due to the water repellency of the fluororesin. Thus, short pass (short cut) of aqueous hydrogen peroxide solution on the internal wall surface (short pass of aqueous hydrogen peroxide solution along the internal wall surface) can be suppressed, i.e., passing of aqueous hydrogen peroxide solution without contacting with the ion exchange resin or the like can be avoided. As a result, the removal of impurities can be accomplished efficiently.

Depending on the type of ion exchange resin, chelate resin or adsorption resin, the purifier tower 12, upstream thereof, may be provided with a heat exchanger for cooling. It is also preferred that the heat exchanger be composed of a fluororesin.

The purifier tower 12 is preferably one capable of resisting a pressure of about 0.3 MPa/cm$^2$. The purifier tower 12 is fitted with pressure sensor 17, and bleeding or other operation is performed according to necessity.

A pressure sensor of the diaphragm type can be used, wherein a pressure change is transmitted by a diaphragm to a pressure receiving part where the pressure change is converted to a signal. Specifically, when the pressure is increased, for example, when the pressure of the purifier tower packed with an anion resin exceeds 0.2 MPa, the possibility of decomposition of hydrogen peroxide is high. The pressure increase is sensed by the pressure sensor 17, and a separate pressure control unit (not shown) is operated. Thus, the liquid feed pump 14 is stopped, and the bleeder valve 20 disposed at the top of the purifier tower is opened. Further, cooled ultra-pure water is fed into the purifier tower, thereby discontinuing the production of purified aqueous hydrogen peroxide solution.

Furthermore, the purifier tower 12 is fitted with temperature sensor 18, which is capable of sensing any heat build-up associated with processing of aqueous hydrogen peroxide solution so as to effect appropriate cooling. A temperature sensor of the thermocouple type or the resistance bulb type can be used, wherein an electromotive force or a resistance value is changed by temperature and the change thereof is converted to a signal. For example, when the temperature inside the purifier tower exceeds a given value, the decomposition of aqueous hydrogen peroxide solution is initiated. Thus, any internal temperature increase of the purifier tower is sensed by the temperature sensor 18, and a separate temperature control unit (not shown) is operated. Accordingly, the liquid feed pump 14 is stopped, and the bleeder valve 20 disposed at the top of the purifier tower is opened. Further, cooled ultra-pure water is fed into the purifier tower, thereby discontinuing the production of purified aqueous hydrogen peroxide solution.

Figure 2:
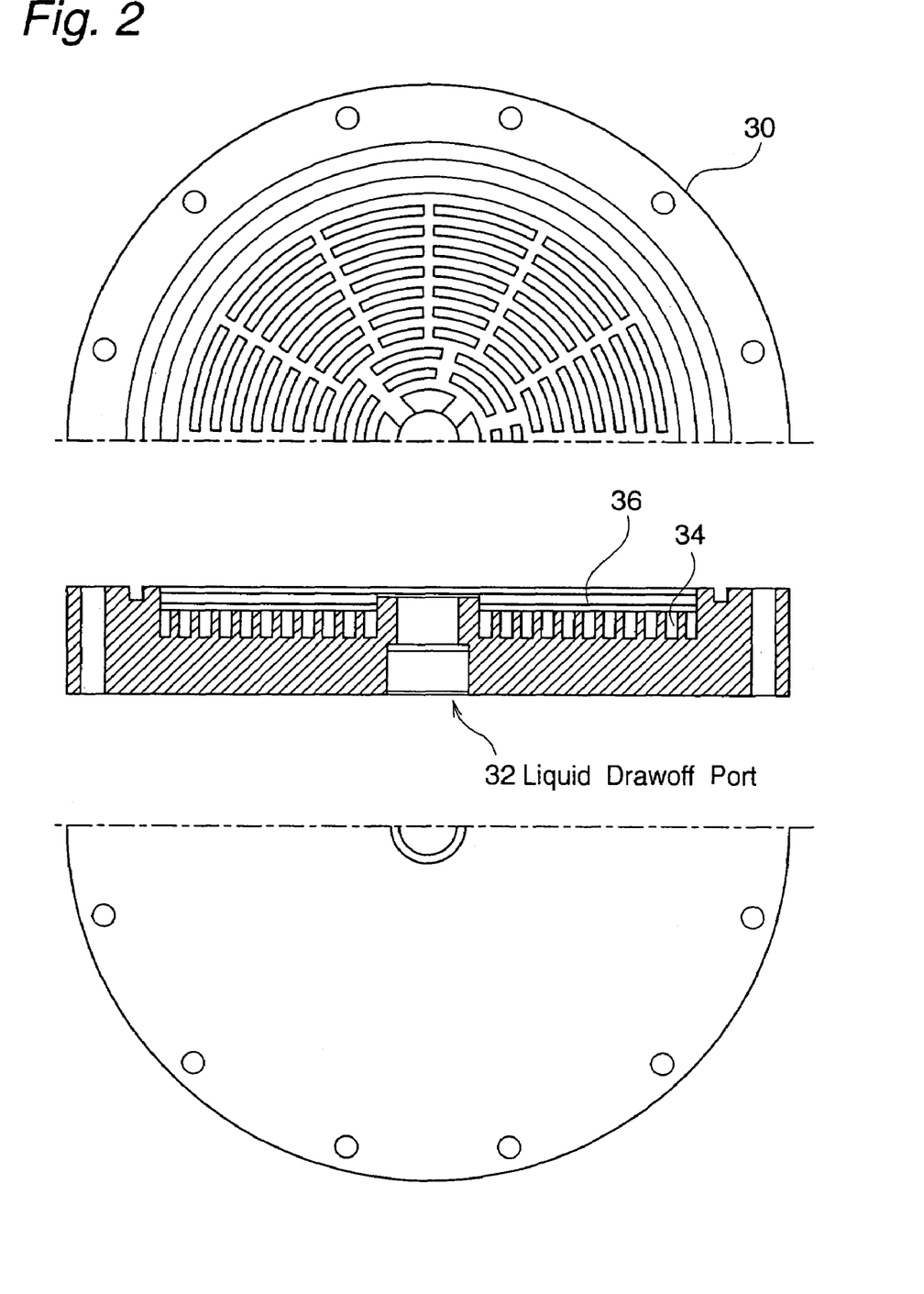
FIG. 2 is a schematic diagram of a flange as a constituent of a strainer for use in a purifier tower to be installed in the process for producing a purified aqueous hydrogen peroxide solution according to the present invention.

The bottom part of the purifier tower 12 is fitted with a strainer (not shown). The strainer comprises a filter (not shown) and, disposed thereunder, flange 30 as shown in FIG. 2.

The flange 30 has vertically through liquid drawoff port 32 at the center thereof and further has a plurality of substantially annular open grooves 34 formed in the form of concentric circles with a given spacing from the liquid drawoff port 32. The open grooves 34 are provided with communicating open grooves 36 spaced at a given angle in the radial direction, which communicate with the liquid drawoff port 32 provided in the center of the flange 30.

Accordingly, the aqueous hydrogen peroxide solution having passed through the filter is led through the open grooves 34 and the communicating open grooves 36 and discharged outside from the liquid drawoff port 32 in the form of substantially a laminar flow.

With respect to the open grooves 34 and the communicating open grooves 36, the groove spacing, spaced angle and groove depth can be appropriately varied and are not particularly limited.

It is preferred that the total void ratio of filter and flange opening be in the range of 50 to 70%, especially 55 to 65%. When the total void ratio is in this range, the aqueous hydrogen peroxide solution can be passed through the purifier tower in the form of a laminar flow with the result that the aqueous hydrogen peroxide solution can be brought into uniform contact with the ion exchange resin, chelate resin or adsorption resin. The above strainer separates the purified aqueous hydrogen peroxide solution from the ion exchange resin, chelate resin or adsorption resin.

In the present invention, as mentioned above, the purifier tower is packed with the ion exchange resin (such as anion exchange resin or cation exchange resin), chelate resin or adsorption resin, depending on the purpose. Also, the purifier tower can be packed with a mixed bed composed of an anion exchange resin and a cation exchange resin.

As the cation exchange resin for use in the present invention, there can be mentioned H$^+$-type cation exchange resin known as a strongly acidic cation exchange resin. Among various strongly acidic cation exchange resins, a strongly acidic cation exchange resin of network molecular structure comprising a crosslinked styrene/divinylbenzene copolymer wherein sulfonate groups are introduced is generally preferred. For example, PK216, SK1B and IR-120B are used as the above H$^+$-type strongly acidic cation exchange resin.

The H$^+$-type cation exchange resin is preferably one regenerated by repeating at least twice a step comprising treating the cation exchange resin with a downflow of aqueous solution of inorganic acid (regenerant) and thereafter washing the cation exchange resin with an upflow of ultra-pure water. In the present invention, it is preferred that the regeneration be conducted by repeating the downflow of an aqueous solution of regenerant followed by the upflow of ultra-pure water at least twice, especially 2 to 12 times.

The treatment of cation exchange resin with an aqueous solution of regenerant is generally performed by passing the aqueous solution of regenerant through the cation exchange resin, discharging the aqueous solution of regenerant and thereafter washing the cation exchange resin with ultra-pure water. In the present invention, it is preferred that the cycle of regenerant passing and ultra-pure water washing be repeated at least twice. When the passing of an aqueous solution of inorganic acid followed by passing of ultra-pure water is repeated, not only can the regeneration be accomplished efficiently and uniformly but also, because of the shrinkage/swelling of cation exchange resin, washing can be effected to the inside of cation exchange resin.

As the inorganic acid, there can be employed any of common inorganic acids such as sulfuric acid and hydrochloric acid. The concentration of inorganic acid in the aqueous regenerant solution is preferably in the range of 5 to 15% by weight, still preferably 5 to 12% by weight. It is preferred that the regenerant be used in an amount of at least 3 times, especially 4 to 12 times, the quantity (volume) of cation exchange resin to be treated.

The regenerant is generally passed downward at a SV (space velocity) of 1 to 5 hr$^{-1}$ and at a BV (bed volume, indicating what volume of aqueous hydrogen peroxide solution is treated per volume of ion exchange resin) of 0.5 to 1 L/L-R. The subsequent washing is performed by passing ultra-pure water upward at a SV of 10 to 30 hr$^{-1}$ and at a BV of 0.1 to 0.5 L/L-R.

After the regenerant passing followed by ultra-pure water passing, an ultra-pure water washing cycle comprising downward passing (downflow) of ultra-pure water and upward passing (upflow) of ultra-pure water is repeated 4 to 9 times to thereby effect complete washing of the regenerated ion exchange resin. It is preferred that the upflow of ultra-pure water be performed at a SV of 10 to 30 hr$^{-1}$ and at a BV of 3 to 5 L/L-R and that the downflow of ultra-pure water be also performed at a SV of 10 to 30 hr$^{-1}$ and at a BV of 3 to 5 L/L-R. The washing is preferably performed with 30 to 60 volumes of ultra-pure water per volume of the resin.

As the anion exchange resin for use in the present invention, there can be mentioned those in the form of carbonate ions, hydrogen carbonate ions, hydroxide ions, fluoride ions and other ions.

As these anion exchange resins, generally, use can be made of, for example, strongly basic resins obtained by chloromethylating a crosslinked styrene/divinylbenzene copolymer and aminating the chloromethylation product with trimethylamine or dimethylethanolamine into a quaternary salt; weakly basic resins comprising a crosslinked styrene/divinylbenzene copolymer having a primary or tertiary amine as an exchange group; resins comprising a crosslinked acrylic acid polymer having a tertiary amine as an exchange group; and pyridine type anion exchange resins comprising a polymer having an unsubstituted or substituted pyridyl group. Of these, strongly basic anion exchange resins having a quaternary ammonium group are preferred. Various anion exchange resins having a quaternary ammonium group are commercially available, representative examples of which include Diaion (trade name) PA series (for example, PA316 and PA416) and SA series (for example, SA10A and SA20A) and Amberlite (trade name) IPA series (for example, IRA-400, IRA-410, IRA-900 and IRA-904). These resins are generally available on the market in the form of chloride ions.

The regenerant for anion exchange resin can be appropriately selected depending on the type of target ions. When the anion exchange resin is in the form of carbonate ions or hydrogen carbonate ions, a known carbonate or bicarbonate salt such as sodium carbonate, sodium bicarbonate, potassium carbonate or potassium bicarbonate can be used as the regenerant. When the anion exchange resin is in the form of hydroxide ions, a strong alkali such as sodium hydroxide or potassium hydroxide can be used as the regenerant. Further, when the anion exchange resin is in the form of fluoride ions, sodium fluoride, potassium fluoride or ammonium fluoride can be used as the regenerant.

The anion exchange resin is preferably one regenerated by repeating at least twice a step comprising treating the above anion exchange resin with a downflow of regenerant and thereafter washing the anion exchange resin with an upflow of ultra-pure water. In the present invention, it is preferred that the regeneration be conducted by repeating cycle comprising downflow of an aqueous solution of regenerant followed by the upflow of ultra-pure water at least twice, especially 2 to 12 times. The treatment of anion exchange resin with an aqueous solution of regenerant is generally performed by passing the aqueous solution of regenerant through the anion exchange resin, discharging the aqueous solution of regenerant and thereafter washing the anion exchange resin with ultra-pure water. In the present invention, it is preferred that the cycle of regenerant passing and ultra-pure water washing be repeated at least twice. When the passing of an aqueous solution of regenerant followed by passing of ultra-pure water is repeated, not only can the regeneration be accomplished efficiently and uniformly but also, because of the shrinkage/swelling of anion exchange resin, washing can be effected to the inside of anion exchange resin.

The appropriate salt concentration of the aqueous regenerant solution is in the range of 2 to 10% by weight, preferably 2 to 8% by weight, when the anion exchange resin is in the form of hydroxide ions; 5 to 15% by weight, preferably 5 to 12% by weight, when the anion exchange resin is in the form of carbonate or hydrogen carbonate ions; and 1 to 4% by weight, preferably 2 to 4% by weight, when the anion exchange resin is in the form of fluoride ions. It is preferred that the aqueous solution of regenerant be used in an amount of at least 3 times; especially 4 to 12 times, the quantity (volume) of anion exchange resin to be treated.

The regenerant is generally passed downward at a SV (space velocity) of 1 to 5 hr$^{-1}$ and at a BV of 0.5 to 1 L/L-R. The subsequent washing is performed by passing ultra-pure water upward at a SV of 10 to 30 hr$^{-1}$ and at a BV of 0.1 to 0.5 L/L-R.

After the regenerant passing followed by ultra-pure water passing, an ultra-pure water washing cycle comprising downflow of ultra-pure water and upflow of ultra-pure water is repeated 4 to 9 times to thereby effect complete washing of the regenerated ion exchange resin. It is preferred that the upward passing of ultra-pure water be performed at a SV of 10 to 30 hr$^{-1}$ and at a BV of 3 to 5 L/L-R and that the downward passing of ultra-pure water be also performed at a SV of 10 to 30 hr$^{-1}$ and at a BV of 3 to 5 L/L-R. The washing is preferably performed with 30 to 60 volumes of ultra-pure water per volume of the resin.

From the viewpoint of oxidation deterioration of resin and safety, it is preferred that the contact of the anion exchange resin with the aqueous hydrogen peroxide solution be performed at low temperature. In particular, more H$^+$ than formed by dissociation of hydrogen peroxide may be contained in the aqueous hydrogen peroxide solution having been treated with the H$^+$-type cation exchange resin in a previous stage, and the H$^+$ may induce an exothermic neutralization reaction with anion exchange groups $CO_3^{2-}$ and $HCO_3^-$. Therefore, when the aqueous hydrogen peroxide solution is treated with the anion exchange resin, it is preferred that cooling be effected to 5° C. or below in advance.

In the process of the present invention, it is preferred that a plurality of towers packed with the above ion exchange resin be connected each other in series when the charged aqueous hydrogen peroxide solution is purified.

For example, preferred combinations of ion exchange resin towers are:

(1) cation exchange resin tower→anion exchange resin tower;

(2) cation exchange resin tower anion exchange resin tower→cation exchange resin tower; and (3) anion exchange resin tower→cation exchange resin tower.

Of these, the combination of cation exchange resin tower→anion exchange resin tower→cation exchange resin tower is especially preferred. In particular, impurities can be most effectively removed by treating the charged aqueous hydrogen peroxide solution with the use of the combination of H$^+$-type cation exchange resin tower→fluoride-form anion exchange resin tower→carbonate or bicarbonate-form anion exchange resin tower→H$^+$-type cation exchange resin tower.

In the use of a plurality of ion exchange resin towers in combination, it is satisfactory to dispose the flow sensor and the flow control unit such as the liquid feed pump 14 may be arranged at a line for feeding the charged aqueous hydrogen peroxide solution to the first purifier tower. However, other ion exchange resin towers can also be fitted with the above flow sensor and flow control unit.

Minute amounts of Na$^+$, K$^+$, Al$^{3+}$ and other matter contained in the charged aqueous hydrogen peroxide solution as impurities can be removed by sequentially bringing the charged aqueous hydrogen peroxide solution into contact with the cation exchange resin, the anion exchange resin and the cation exchange resin. Therefore, the removal of metal ion impurities can be accomplished to an extremely high level (order of ppt or sub-ppt). When use is made of the anion exchange resin in the fluoride form, silicon oxide impurities can be removed from the aqueous hydrogen peroxide solution. Using the anion exchange resin in the form of carbonate ions or hydrogen carbonate ions is preferred from the viewpoint that the counter ions to $Na^+$, $K^+$ and $Al^{3+}$ to be removed are carbonate ions or hydrogen carbonate ions, these being converted to carbon dioxide after cation exchange and evaporated with the result that these do not remain in the aqueous hydrogen peroxide solution.

Packing the purifier tower with the chelate resin or adsorption resin in place of the above ion exchange resin enables effectively removing impurities of the charged aqueous hydrogen peroxide solution whose removal ratio is low with the use of ion exchange resin, such as iron ions, Al ions and organic impurities.

The chelate resin is not limited as long as the resin exhibits a chelate force to metal ions, and can be, for example, any of iminodiacetic acid type, polyamine type and phosphonic acid type resins. In particular, phosphonic acid type chelate resins can preferably be used.

The phosphonic acid type chelate resins are chelate resins wherein a functional group having a phosphonic acid group is introduced. Especially preferred use is made of iminomethylenephosphonic acid type and iminodi (methylenephosphonic acid) type chelate resins having a group comprising a nitrogen atom and, bonded thereto via a methylene group, a phosphonic acid group, represented by the formula —$N(CH_2PO_3H_2)_nH_{2-n}$ wherein n is 1 or 2. Any of the phosphonic acid type chelate resins, although generally used with its phosphonic acid group being in the form of a free acid, can also be used with its phosphonic acid group being in the form of a salt such as an ammonium salt. The phosphonic acid type chelate resins are especially preferred in practical application from the viewpoint that, even if used in the purification of aqueous hydrogen peroxide solution for a prolonged period of time, deterioration thereof is slight.

Porous resins having no ion exchange capability are used as the adsorption resin. The porous resins are, for example, resins composed of a styrene/divinylbenzene copolymer and having no ion exchange group. It is preferred that the porous resins have a specific surface area (measured in accordance with the BET method using $N_2$) of about 200 to about 900 $m^2/g$, especially 400 to 900 $m^2/g$, on the basis of dry resin. Further, it is preferred that the pores be continuous and that the porous resins have a pore volume (measured by the mercury penetration method) of about 0.6 to about 1.2 ml/g, especially 0.7 to 1.1 ml/g, on the basis of dry resin. These porous resins can be, for example, resins obtained by polymerizing styrene and crosslinking the polymer with divinylbenzene to thereby form a network molecular structure. As such adsorption resins, there can be mentioned, for example, Amberlite (trade name, produced by Rohm & Haas) XAD-2 and XAD-4, and HP10, HP20, HP21, HP30, HP40, HP50, SP800 and SP900 produced by Mitsubishi Chemical Corporation, Ltd.

As the adsorption resin, halogenated porous resins can be used. Suitable examples of the halogenated porous resins include a halogenation product of a crosslinked polymer from an aromatic monovinyl monomer such as styrene or vinyltoluene and an aromatic polyvinyl monomer such as divinylbenzene or trivinylbenzene; a crosslinked polymer from a halogenated aromatic monovinyl monomer such as monochlorostyrene or monobromostyrene and an aromatic polyvinyl monomer; and a crosslinked polymer from a halogenated aromatic monovinyl monomer, an aromatic monovinyl monomer and an aromatic polyvinyl monomer. Among these halogenated porous resins, halogenation products of a styrene/divinylbenzene copolymer are especially preferred. As such, there can be mentioned, for example, Sepabeads SP207 (trade name) composed of a brominated styrene/divinylbenzene copolymer and having a specific gravity of about 1.2. Furthermore, a crosslinked polymer from an aromatic monovinyl monomer and an aromatic polyvinyl monomer, wherein a hydrophilic group such as a hydroxyl group, a chloroalkyl group or a hydroxyalkyl group is introduced, can also be used as the adsorption resin. The chloroalkyl group is represented by the formula: —$(CH_2)_nCl$, and the hydroxyalkyl group is represented by the formula: —$(CH_2)_nOH$. When the linear chain is long, the hydrophilicity is low. Therefore, practically, it is preferred that n be in the range of 1 to 5. Such a resin is commercially available. As such, there is known, for example, Bofazit EP 63 (trade name, produced by Bayer).

Organic impurities and other impurities can be highly effectively removed from the aqueous hydrogen peroxide solution by carrying out the above purification process, thereby the amount of total organic carbon (TOC) can be reduced.

The impurities of the charged aqueous hydrogen peroxide solution can be more effectively removed by combining the treatment using the chelate resin and the adsorption resin with the treatment using the ion exchange resin described earlier.

In the process for producing purified hydrogen peroxide according to the present invention, the above purifier towers may be used alone or in combination. In the use of purifier towers in combination, for example, the charged aqueous hydrogen peroxide solution may be treated first with the adsorption resin tower (purifier tower packed with adsorption resin), subsequently with the chelate resin tower (purifier tower packed with chelate resin) and thereafter with the ion exchange resin tower (purifier tower packed with ion exchange resin). Alternatively, the charged aqueous hydrogen peroxide solution may be treated first with the ion exchange resin tower, subsequently with the adsorption resin tower and thereafter with the chelate resin tower. The combination of adsorption resin tower→$H^+$-type cation exchange resin tower→fluoride-form anion exchange resin tower→carbonate or bicarbonate-form anion exchange resin tower→$H^+$-type cation exchange resin tower is especially preferred. In the use of this combination, the impurity level of the aqueous hydrogen peroxide solution can be minimized.

In the use of the chelate resin tower, adsorption resin tower and ion exchange resin tower in combination, the liquid feed pump 14 and flow sensor 16 may be disposed upstream of each of the purifier towers, or may be disposed only upstream of the purifier tower through which the aqueous hydrogen peroxide solution is first passed.

It is especially preferred that the liquid feed pump 14 be disposed upstream of the adsorption resin tower and upstream of the ion exchange resin tower. Specifically, in the use of the combination of adsorption resin tower→$H^+$-type cation exchange resin tower→fluoride-form anion exchange resin tower→carbonate or bicarbonate-form anion exchange resin tower→$H^+$-type cation exchange resin tower, it is preferred that the liquid feed pump 14 be disposed where the aqueous hydrogen peroxide solution is fed to the adsorption resin tower and where the aqueous hydrogen peroxide solution having been treated with the adsorption resin tower is fed to the H$^+$-type cation exchange resin tower.

In the present invention, prior to the above purification operation by means of purifier tower(s), it is preferred that a coagulant be added to the charged aqueous hydrogen peroxide solution and passed through a superfine filter to thereby remove insoluble metal ion impurities contained in the aqueous hydrogen peroxide solution as solid impurities. This filtration is preferably performed before the treatment of aqueous hydrogen peroxide solution with the ion exchange resin. In the treatment using the adsorption resin tower, the filtration may be performed before that treatment, or after that treatment. However, filtering before the treatment with the adsorption resin tower is preferred because impurities can be removed with extremely high efficiency.

These insoluble metal ion impurities, like the soluble metal ion impurities, are attributed to water used in production, floating dust and materials of production apparatus.

The coagulant is added to coagulate insoluble metal ion impurities in the aqueous hydrogen peroxide solution so that they can be separated by filtration. Generally, a phosphorous compound is used as the coagulant. As the phosphorous compound, there can preferably be used at least one phosphorous compound selected from the group consisting of phosphoric acid, polyphosphoric acid, acid sodium pyrophosphate, aminotri(methylenephosphonic acid) and its salts, ethylenediaminetetra(methylenephosphonic acid) and its salts.

After the addition of the phosphorous compound, it is generally preferred that the mixture be aged for at least one day, especially one to five days. The aging may be carried out with or without stirring. By virtue of this aging, insoluble metal ion impurities in the aqueous hydrogen peroxide solution are flocculated and grown to filtered aggregation/growth to such an extent that they can be separated by filtration.

The average pore diameter of the superfine filter for use in the filtration is preferably 0.2 μm or less, still preferably 0.1 μm or less. The material constituting the superfine filter is not particularly limited as long as no components leached into the aqueous hydrogen peroxide solution are contained therein, and is, for example, selected from among fluororesins, polyolefin resins (e.g., polyethylene or polypropylene), polysulfone resins and polycarbonate resins. Of these, fluororesins are preferred.

According to necessity, ultra-pure water may be added to the thus obtained aqueous hydrogen peroxide solution to thereby adjust the concentration of hydrogen peroxide therein. Suitable ultra-pure water is one from which impurities have been removed to a desirably high degree.

As a result of the above purification operations, there can be obtained the highly purified aqueous hydrogen peroxide solution whereof the impurity concentration has been reduced to ppt level or its vicinity.

Furthermore, in the present invention, use can be made of the charged aqueous hydrogen peroxide solution from which organic impurities have been removed to a high degree by known methods. Also, from the highly purified aqueous hydrogen peroxide solution obtained by the process of the present invention, organic impurities may be further removed by known methods. As known methods for removing organic impurities, there can be mentioned, for example, distillation, use of an ultrafilter membrane filter and use of a reverse osmosis membrane. The combination of these methods with the process of the present invention enables producing the purified aqueous hydrogen peroxide solution whose impurity content is extremely low.

In the present invention, the leaving of gas in the purifier tower packed with the ion exchange resin can be avoided. Further, disordering of ion exchange band can be avoided, and the impurity ion adsorption layer (ion exchange band) can be formed perpendicularly and sharply to the flow direction. Accordingly, impurities can be effectively removed from the charged aqueous hydrogen peroxide solution to thereby enable obtaining the purified aqueous hydrogen peroxide solution of extremely high quality. Moreover, the process of the present invention is safe, realizes high purification efficiency for aqueous hydrogen peroxide solution, exhibits high reproducibility with respect to the content of impurities, and is stable.

EXAMPLE

The present invention will further be illustrated below with reference to the following Example which in no way limits the scope of the invention.

Herein, metal ion impurities were measured by the flameless atomic absorption spectroscopy, the ICP-AES method and the ICP-MS method. The ppm, ppb and ppt are all on the weight basis.

Example 1

Acid sodium pyrophosphate was added to a 60.1% by weight aqueous hydrogen peroxide solution containing metal ion impurities as listed in Table 1 below so that the concentration of acid sodium pyrophosphate was 0.070 g/lit. The mixture was allowed to stand still for 3 days to thereby effect aging, and passed through a filter of 0.1 μm average pore diameter. The ratio of metal atom Al as a component of the metal ion impurities to P atom as a component of the added acid sodium pyrophosphate (atomic ratio of Al/P) was 0.039.

Figure 3:
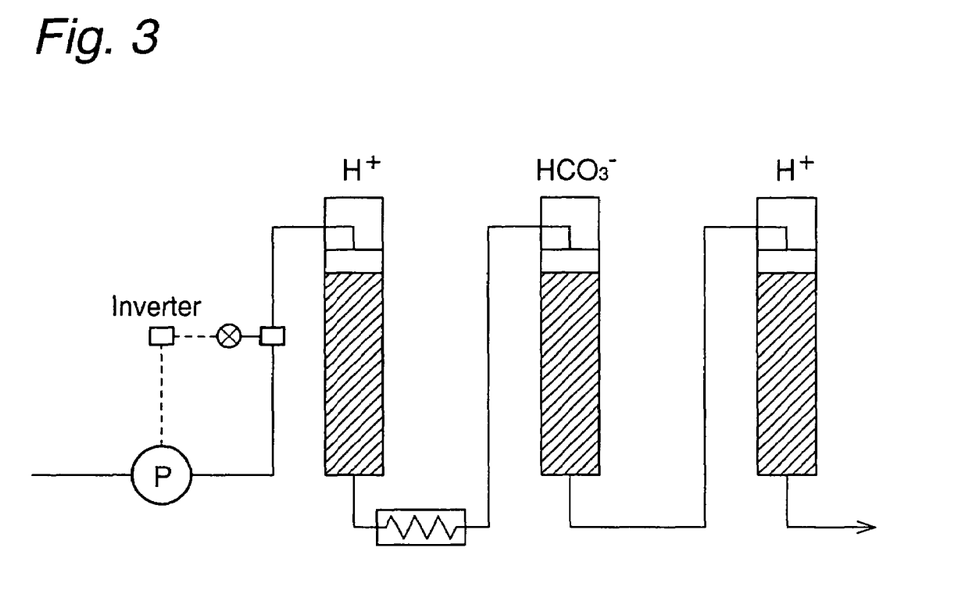
FIG. 3 is a schematic diagram showing the flow of operation of the process for producing a purified aqueous hydrogen peroxide solution, performed in Example 1.

The thus filtered aqueous hydrogen peroxide solution was purified by sequentially passing the same through, referring to FIG. 3, a first-stage H$^+$-type cation exchange resin tower, a heat exchanger, a bicarbonate-ion-form anion exchange resin tower and a second-stage H$^+$-type cation exchange resin tower while controlling a liquid feed pump in cooperation with a flow sensor so as to maintain the flow space velocity (SV) at a constant rate of 15 hr$^{-1}$. In each of the purifier towers, the aqueous hydrogen peroxide solution was caused to flow downward (downflow), and the liquid level was controlled so that the liquid surface was held above the ion exchange resin layer. The pas sing of the aqueous hydrogen peroxide solution through the bicarbonate-ion-form anion exchange resin tower was carried out while cooling the aqueous hydrogen peroxide solution to –3° C. by means of the heat exchanger.

The regeneration of the above ion exchange resins was performed with the use of another ion exchange tower (regeneration tower) disposed separate from the aqueous hydrogen peroxide solution purifier towers.

A product of regeneration of used SKIB was utilized as the first-stage and second-stage H$^+$-type cation exchange resins. A 10% by weight aqueous hydrochloric acid solution was utilized as the regenerant. The regeneration of the cation exchange resin was carried out by packing the cation exchange resin into a regeneration tower different from the purifier towers and by repeating 10 times a step comprising downflow of the aqueous regenerant solution through the tower at a SV of 2.25 hr$^{-1}$ and at a BV of 0.75 L/L-R, discontinuing the passing of the aqueous regenerant solution and upflow of ultra-pure water through the tower at a SV of 13.2 hr$^{-1}$ and at a BV of 0.3 L/L-R. Thereafter, ultra-pure water washing of the cation exchange resin was carried out by repeating 6 times a cycle comprising downward passing ultra-pure water through the tower at a SV of 13.2 hr$^{-1}$ and at a BV of 3.3 L/L-R and upflow of ultra-pure water through the tower at the same SV and BV. Thus, the regeneration of the H$^+$-type cation exchange resin was completed.

A product of regeneration of spent SA20A was utilized as the bicarbonate-ion-form anion exchange resin. The used anion exchange resin was first regenerated with sodium hydroxide. A 5% by weight aqueous sodium hydroxide solution was utilized as the regenerant. The regeneration of the anion exchange resin was also carried out by packing the anion exchange resin into a regeneration tower different from the purifier towers and by repeating 6 times a step comprising downflow of the aqueous regenerant solution through the tower at a SV of 2.25 hr$^{-1}$ and at a BV of 0.75 L/L-R, discontinuing the passing of the aqueous regenerant solution and upflow of ultra-pure water through the tower at a SV of 13.2 hr$^{-1}$ and at a BV of 0.3 L/L-R. Thereafter, ultra-pure water washing of the anion exchange resin was carried out by repeating 5 times a cycle comprising downward passing ultra-pure water through the tower at a SV of 13.2 hr$^{-1}$ and at a BV of 3.3 L/L-R and upflow of ultra-pure water through the tower at the same SV and BV. Thus, there was obtained OH$^-$-type anion exchange resin.

Subsequently, this OH$^-$-type anion exchange resin was regenerated with sodium bicarbonate. A 8% by weight aqueous sodium bicarbonate solution was utilized as the regenerant. The regeneration with sodium bicarbonate was also carried out by packing the anion exchange resin into a regeneration tower different from the purifier towers and by repeating 12 times a step comprising downflow of the aqueous regenerant solution through the tower at a SV of 2.25 hr$^{-1}$ and at a BV of 0.75 L/L-R, discontinuing the passing of the aqueous solution of regenerant, and upflow of ultra-pure water through the tower at a SV of 13.2 hr$^{-1}$ and at a BV of 0.3 L/L-R. Thereafter, ultra-pure water washing of the anion exchange resin was carried out by repeating 6 times a cycle comprising downflow of ultra-pure water through the tower at a SV of 13.2 hr$^{-1}$ and at a BV of 3.3 L/L-R and upflow of ultra-pure water through the tower at the same SV and BV. Thus, there was obtained HCO$_3^-$-type anion exchange resin.

The thus regenerated ion exchange resins were packed in the form of a slurry into the respective purifier towers and subjected to practical use.

After the completion of passing of aqueous hydrogen peroxide solution through the ion exchange resin towers, the purified aqueous hydrogen peroxide solution having been discharged from the final H$^+$-type cation exchange resin tower was sampled and diluted with ultra-pure water from which impurities had been removed to an extremely high degree so as to adjust the concentration of hydrogen peroxide to 31% by weight.

The concentrations of metal ion impurities in the thus obtained purified aqueous hydrogen peroxide solution were measured by the flameless atomic absorption method and the ICP-MS method. On the other hand, the concentrations of metal ion impurities in the charged aqueous hydrogen peroxide solution were measured by the flameless atomic absorption method and the ICP-AES method.

The results are given in Table 2.

Exhibited impurity removing level remained unchanged despite continuous operation until BV=500 L/L-R corresponding to the end of ion exchange resin life.

TABLE 1

Metal impurities in charged aqueous hydrogen peroxide solution

| Impurities | Analyzed value (ppb) |
|---|---|
| Al | 770 |
| Cu | 0.2 |
| Fe | 4.5 |
| K | 132 |
| Na | 15160 |
| Pb | 2 |
| Ca | 0.6 |
| Mg | 0.6 |

TABLE 2

Content of metal impurities in obtained purified aqueous hydrogen peroxide solution

| | Measuring limit (ppt) | Measured value (ppt) |
|---|---|---|
| Ag | 0.5 | ND |
| Al | 0.2 | 0.2 |
| As | 2 | ND |
| Au | 0.2 | ND |
| B | 4 | ND |
| Ba | 0.1 | ND |
| Be | 5 | ND |
| Bi | 0.2 | ND |
| Ca | 2 | ND |
| Cd | 0.3 | ND |
| Co | 1 | ND |
| Cr | 1 | 1 |
| Cu | 0.5 | ND |
| Fe | 0.5 | 0.7 |
| Ga | 0.5 | ND |
| Ge | 2 | ND |
| In | 0.1 | ND |
| K | 2 | ND |
| Li | 0.02 | ND |
| Mg | 0.2 | ND |
| Mn | 0.3 | ND |
| Mo | 0.3 | ND |
| Na | 0.5 | ND |
| Nb | 0.1 | ND |
| Ni | 0.7 | ND |
| Pb | 0.1 | ND |
| Pd | 0.3 | ND |
| Pt | 0.2 | ND |
| Sb | 0.3 | ND |
| Sn | 0.8 | ND |
| Sr | 0.05 | ND |
| Ta | 0.1 | ND |
| Ti | 2 | ND |
| Tl | 0.1 | ND |
| V | 1 | ND |
| Zn | 2 | ND |
| Zr | 0.1 | 0.1 |

ND: means that the amount of metal impurities is less than the measuring limit.

Comparative Example 1

Figure 4:
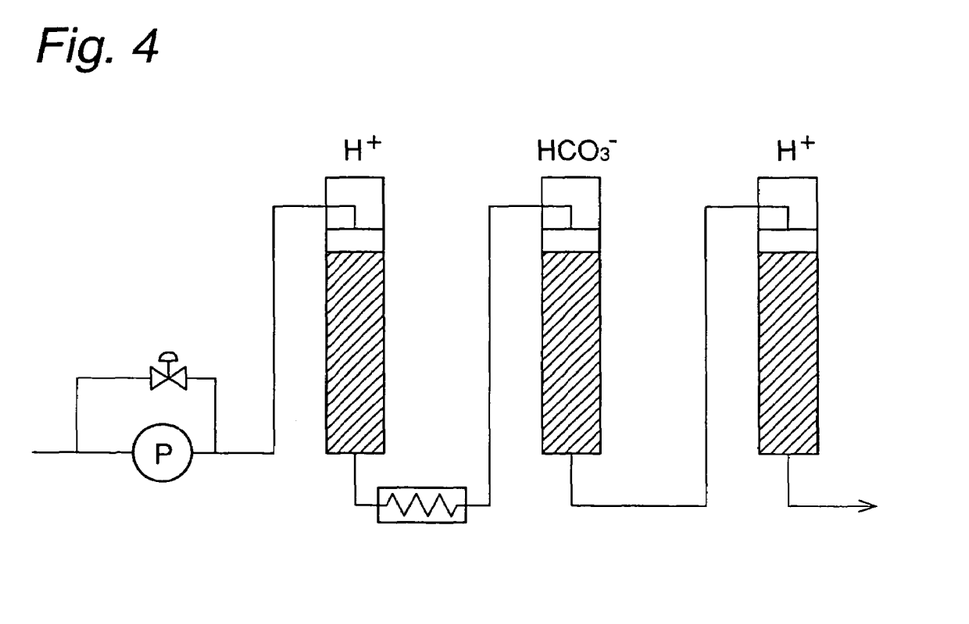
FIG. 4 is a schematic diagram showing the flow of operation of the process for producing a purified aqueous hydrogen peroxide solution, performed in Comparative Example 1.

Charged aqueous hydrogen peroxide solution was purified in the same manner as in Example 1, except that, referring to FIG. 4, an outlet portion of the liquid feed pump was fitted with a bypass with a valve for regulating the liquid feed, except that the space velocity (SV) was set for 15 hr$^{-1}$ by the valve at the initial stage, the flow rate not controlled thereafter, and except that no level control was effected in the purifier towers.

As a result, bubbles slowly began to stick to the anion exchange resin in the form of bicarbonate ions, so that not only was the flow rate lowered but also a liquid surface rise and pressure increase began. The growth of bubbles led to formation of a shortcut and caused disordering of ion exchange band. Upon an elapse of BV=75 L/L-R, the SV was decreased to 5 $hr^{-1}$, and leakage of Al, Na, etc. began. The aqueous hydrogen peroxide solution was sampled upon an elapse of 8 hr, and the hydrogen peroxide concentration thereof was adjusted to 31% by weight. In the resultant solution, the concentration of Al impurities was 60 ppt, and the concentration of Na impurities was 50 ppt.

What is claimed is:

1. An apparatus for producing a purified aqueous hydrogen peroxide solution, comprising at least one purifier tower packed with an ion exchange resin, a chelate resin or an adsorption resin for receiving a charged aqueous hydrogen peroxide solution containing impurities so as to effect contact thereof with the ion exchange resin, chelate resin or adsorption resin, thereby purifying, the charged aqueous hydrogen peroxide solution, which apparatus further comprises:

a feed pump of given output capable of causing the charged aqueous hydrogen peroxide solution to flow to the purifier tower, a flow sensor capable of sensing a flow rate of charged aqueous hydrogen peroxide solution being fed to the purifier tower by means of the feed pump, and a flow control unit capable of controlling the output of the feed pump on the basis of a detection result of the flow sensor so as to maintain the flow of charged aqueous hydrogen peroxide solution being fed to the purifier tower at a constant rate, wherein the flow control unit is one capable of controlling the flow rate of charged aqueous hydrogen peroxide solution being fed to the purifier tower so as to be in the range of 5 to 40$hr^{-1}$ in terms of space velocity.

2. The apparatus as claimed in claim 1, wherein the flow control unit is an inverter control unit capable of controlling the output of the feed pump for the charged aqueous hydrogen peroxide solution by means of an inverter.

3. The apparatus as claimed in claim 1, wherein the flow control unit is one capable of controlling the flow rate of charged aqueous hydrogen peroxide solution being fed to the purifier tower so that its variation falls within the range of ±2.5%.

4. The apparatus as claimed in claim 1, wherein any part brought into contact with the aqueous hydrogen peroxide solution is composed of a fluororesin.

5. The apparatus as claimed in claim 1, which further comprises a level sensor capable of detecting a water level in the purifier tower and a level control unit capable of maintaining the water of the purifier tower at a constant level on the basis of a detection result of the level sensor.

6. The apparatus as claimed in claim 1, which further comprises a pressure sensor capable of detecting an internal pressure of the purifier tower and a pressure control unit capable of maintaining an internal part of the purifier tower at a constant pressure on the basis of a detection result of the pressure sensor.

7. The apparatus as claimed in claim 6, wherein the pressure control unit is one capable of effecting such a control as to carry out not only stopping of the feed pump but also feeding of cooling water into the purifier tower on the basis of a detection result of the pressure sensor.

8. The apparatus as claimed in claim 1, which further comprises a temperature sensor capable of detecting an internal temperature of the purifier tower and a temperature control unit capable of maintaining an internal part of the purifier tower at a constant temperature on the basis of a detection result of the temperature sensor.

9. The apparatus as claimed in claim 8, wherein the temperature control unit is one capable of effecting such a control as to carry out not only stopping of the feed pump but also feeding of cooling water into the purifier tower on the basis of a detection result of the temperature sensor.

10. The apparatus as claimed in claim 1, which further comprises a strainer arranged at a bottom part of the purifier tower, said strainer comprising a filter and, disposed thereunder, a flange member having at its center a liquid drawoff port and having open grooves disposed substantially in the form of concentric circles, said open grooves communicating with the liquid drawoff port.

11. The apparatus as claimed in claim 1, wherein a plurality of purifier towers are connected to each other in series.

12. The apparatus as claimed in claim 1, wherein a plurality of purifier towers are connected to each other in series, and the flow sensor and the flow control unit are arranged at a line for feeding the charged aqueous hydrogen peroxide solution to the first purifier tower.

13. The apparatus as claimed in claim 2, wherein the flow control unit is one capable of controlling the flow rate of charged aqueous hydrogen peroxide solution being fed to the purifier tower so as to be in the range of 5 to 40 $hr^{-1}$ in terms of space velocity.

14. The apparatus as claimed in claim 2, wherein the flow control unit is one capable of controlling the flow rate of charged aqueous hydrogen peroxide solution being fed to the purifier tower so that its variation falls within the range of ±2.5%.

15. The apparatus as claimed in claim 1, wherein the flow control unit is one capable of controlling the flow rate of charged aqueous hydrogen peroxide solution being fed to the purifier tower so that its variation falls within the range of ±2.5%.

16. The apparatus as claimed in claim 13, wherein any part brought into contact with the aqueous hydrogen peroxide solution is composed of a fluororesin.

17. The apparatus as claimed in claim 15, wherein any part brought into contact with the aqueous hydrogen peroxide solution is composed of a fluororesin.

18. The apparatus as claimed in claim 16, which further comprises a level sensor capable of detecting a water level in the purifier tower and a level control unit capable of maintaining the water of the purifier tower at a constant level on the basis of a detection result of the level sensor.

19. The apparatus as claimed in claim 17, which further comprises a level sensor capable of detecting a water level in the purifier tower and a level control unit capable of maintaining the water of the purifier tower at a constant level on the basis of a detection result of the level sensor.

20. The apparatus as claimed in claim 18, which further comprises a pressure sensor capable of detecting an internal pressure of the purifier tower and a pressure control unit capable of maintaining an internal part of the purifier tower at a constant pressure on the basis of a detection result of the pressure sensor.

21. The apparatus as claimed in claim 19, which further comprises a pressure sensor capable of detecting an internal pressure of the purifier tower and a pressure control unit capable of maintaining an internal part of the purifier tower at a constant pressure on the basis of a detection result of the pressure sensor.

22. The apparatus as claimed in claim 7, which further comprises a temperature sensor capable of detecting an internal temperature of the purifier tower and a temperature control unit capable of maintaining an internal part of the purifier tower at a constant temperature on the basis of a detection result of the temperature sensor.

23. The apparatus as claimed in claim 9, which further comprises a strainer arranged at a bottom part of the purifier tower, said strainer comprising a filter and, disposed thereunder, a flange member having at its center a liquid drawoff port and having open grooves disposed substantially in the form of concentric circles, said open grooves communicating with the liquid drawoff port.

24. The apparatus as claimed in claim 10, wherein a plurality of purifier towers are connected to each other in series.

25. The apparatus as claimed in claim 11, wherein a plurality of purifier towers are connected to each other in series, and the flow sensor and the flow control unit are arranged at a line for feeding the charged aqueous hydrogen peroxide solution to the first purifier tower.

\* \* \* \* \*